Patented May 20, 1952

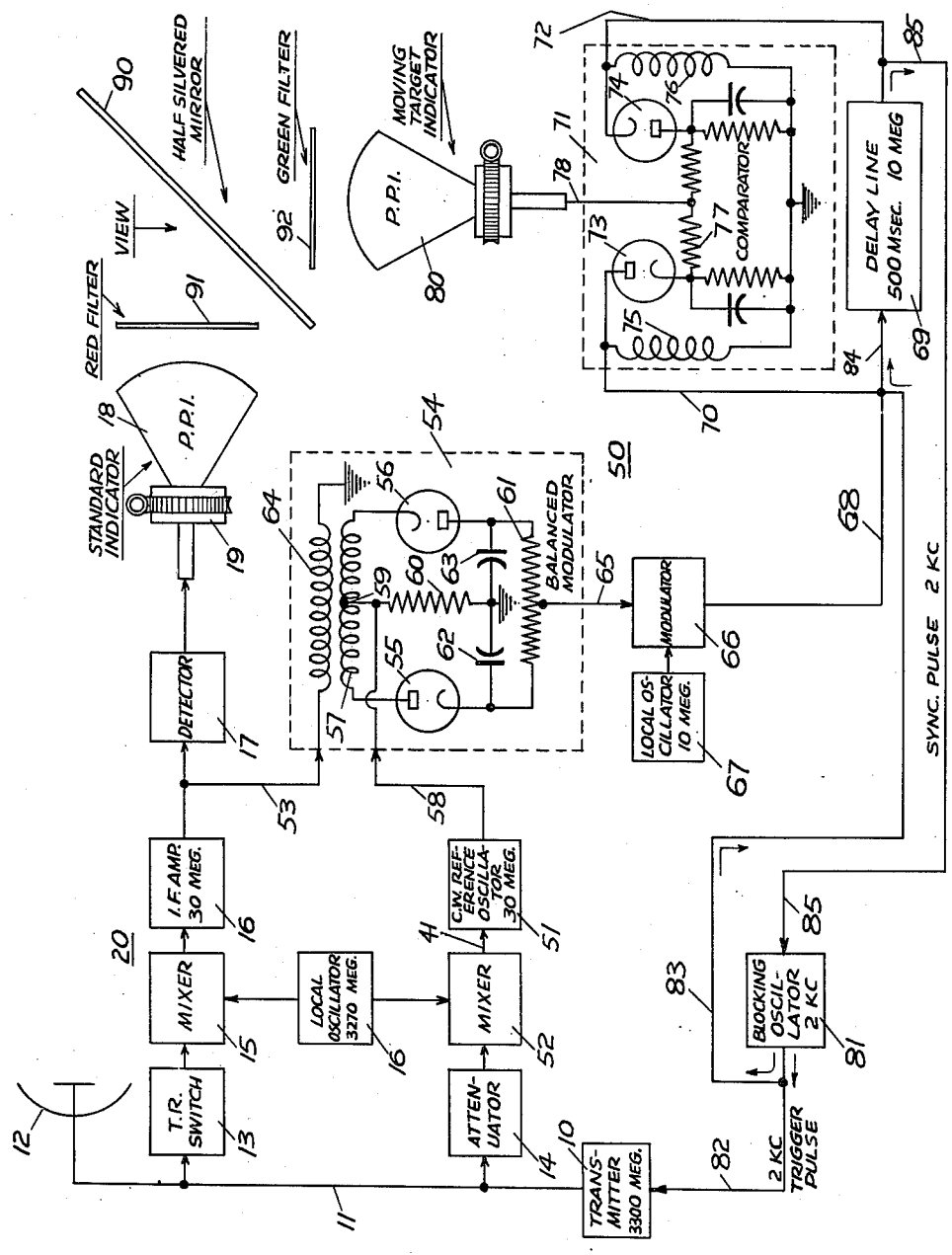

2,597,636

UNITED STATES PATENT OFFICE 2,597,636

RADAR MOVING TARGET INDICATING SYSTEM

William M. Hall, Lexington, and Harold N. Beveridge, Arlington, Mass., assignors to Raytheon Manufacturing Company, Newton, Mass., a corporation of Delaware Application April 17, 1947, Serial No. 742,048

4 Claims. (Cl. 343—9.5)

The present invention relates to an improved radar receiving and indicating system for simultaneously and clearly indicating on a single indicating device the position of both fixed and moving objects within the range of the system.

It is an important object of this invention to provide an improved form of radio direction and ranging system having means for producing standard indications in one optical identifying sense of both fixed and moving targets or objects together with a second means for indicating in another optical identifying sense the moving targets or objects only, the system further including means for optically superposing the two aforesaid indications in a manner to give a single, clear and easily readable indication of the moving objects in the presence of large masses of indications representative of fixed land objects or "ground clutter" within the range of the system.

It is a serious disadvantage of known radar receiving and indicating systems that the indication of moving objects in the presence of large masses of indications of fixed objects or "ground clutter" is very difficult to obtain due to the apparent merging of the moving object indications with the fixed object indications on the fluorescent screen of the indicating cathode ray tube. The system of this invention provides for the simultaneous operation of a standard form of radar receiving circuit for producing video voltage pulses of both fixed and moving objects together with a special form of radar receiving circuit which produces video voltage pulses of moving objects only. The pulse output from each circuit, in the system of the invention, is applied to individual indicating cathode ray tubes which may preferably be of the plan position indicating type and the resultant visual indications are optically combined through means of a half-silvered mirror or the like to produce a single combined visual indication. By interposing suitably different color filters in front of each plan position indicator, as described by this invention, the combined visual indication will enable the presence of moving objects to be readily detectable and indicated even in the presence of large masses of indications of fixed or land objects.

Other objects and advantages of the invention will be apparent with reference to the following specification and drawing in which the single figure is a combined diagrammatic and schematic illustration of a preferred form of the system of the invention.

Referring to the drawing, a radar transmitter 10, preferably having an operating frequency of 3300 megacycles per second, is provided. A suitable pulse interval or repetition rate for the pulse output of the radar transmitter may be provided and, for purposes of this description, the radar system is intended to operate with a pulse interval of 500 microseconds and a pulse duration of approximately one microsecond. The means for accurately triggering the transmitter 10 to predetermine the pulse interval will be later referred to in connection with the description of the special form of radar receiving system for indicating moving targets or objects only. The pulse output from the transmitter 10 is applied by the transmission line 11 to the combined radiating and receiving antenna 12 of any suitable known design which may be mechanically rotated about in azimuth. Transmitted pulses in the transmission line 11 are prevented from entering the standard radar receiving system generally shown at 20 by a conventional form of transmit receive switch 13. Transmitted pulses in the transmission line 11 are effectively applied, however, to the special form of moving target radar receiving and indicating system generally shown at 50 through the medium of an attenuating circuit 14. The attenuating circuit 14 reduces the power of the transmitted pulse so as to prevent damage to the input circuits of the moving target radar receiving and indicating system 50 and further attenuates the reflected pulses received at the antenna 12 to such an extent that they are imperceptible at the aforesaid input circuits.

Reflected pulses indicative of both fixed and moving objects within the range of the antenna 12 at any given instant are applied through the transmit receive switch 13 to a mixer circuit 15 where they are combined with a signal from the local oscillator 16 having a suitable operating frequency of 3270 megacycles per second. The intermediate frequency pulse output of 30 megacycle frequency thus produced from the mixer 15 is suitably amplified at 16, detected at 17 and applied as a video voltage pulse to a plan position indicating cathode ray tube 18. One form of plan position indicating tube 18 may be of the type shown to have a continuously rotated sweep coil 19 synchronized in rotation with the rotation of the antenna 12 as it is rotated about in azimuth. Thus, indications on the screen of the plan position indicating cathode ray tube 18 will be obtained which are indicative of all objects within the range of the antenna 12 and, as is conventional in such systems, the fluorescent screen of the cathode ray tube 18 is provided with a relatively long retention time so that a plan indication is obtained of all objects within the range area of the rotating antenna 12.

As has already been noted, the indications on the screen of the standard type of plan position indicating cathode ray tube 18 do not enable the identification of moving objects in the presence of large masses of fixed object indications due to the apparent merging of all such indications in the one color fluorescence of relatively long retentivity on the cathode ray tube fluorescent screen. In order to facilitate the identification of a moving object when it moves into the range of indication of large masses of fixed objects such as "ground clutter" or the like, the system of the invention provides for a simultaneous separate indication of moving objects only which may be viewed on the fluorescent screen of a separate cathode ray tube in a different color and optically superposed over the standard form of indications.

There are a number of known forms of special types of radar receiving systems for indicating moving targets or objects only and, in the moving target radar receiving system 50 described in connection with the indicating system of this invention, a separate reference oscillator 51 having a frequency of 30 megacycles per second is provided. The reference oscillator 51 is of the continuous wave type which is, however, continuously locked in phase with the phase of each transmitted pulse from the radar transmitter 10. In order to lock the continuous wave reference oscillator 51 in phase with the phase of each transmitted radar pulse, a sample of each transmitted pulse is applied through the attenuator circuit 14 to the mixer circuit 52 for combining the transmitted pulse with the output of the local oscillator 16 and producing an attenuated intermediate pulse frequency of 30 megacycles per second in line 41. The intermediate pulse frequency of 30 megacycles per second in line 41 is then capacitively coupled to the grid circuit of the continuous wave reference oscillator 51 or in any other suitable manner of connection for locking the phase of the reference oscillator with the phase of each transmitted pulse. The output of the continuous wave reference oscillator appearing in line 58 is thus continuously locked in phase with the phase of each succeeding transmitted radar pulse from the transmitter 10 and is then to be compared in phase to the phase of a reflected pulse as obtained from the intermediate frequency amplifier 16 and applied through line 53 to the balanced modulator 54.

The balanced modulator 54 may be of any type which will produce a voltage output that is indicative in amplitude and polarity of the phase and amplitude relations between two separate electrical quantities of the same frequency applied to its input circuits and which further will produce zero output voltage when only one of the two electrical quantities is applied to its input circuits. The balanced modulator 54 in the system of this invention may preferably be of the type employing a pair of diodes 55 and 56 connected as shown. The plate of diode 55 is connected to one end of the center-tapped input coupling coil secondary winding 57 while the cathode of diode 56 is connected to the other end of the secondary winding 57. The secondary winding 57 is center-tapped at 59 and the output from the continuous wave reference oscillator 51 is applied by line 58 to the center tap 59 as appearing across load resistance 60 to ground. The cathode of diode 55 is connected to the plate of diode 56 through a center-tapped output load resistance 61 and suitable filter condensers 62 and 63 are connected from each end of the center-tapped output resistance 61 to ground. The reflected pulse signals of an intermediate frequency of 30 megacycles per second in line 53 are applied to the balanced modulator circuit 54 through the primary winding 64 of the input coupling coil and are inductively coupled to the secondary winding 57 previously referred to. In the absence of any reflected pulse signals in the primary winding 64, the continuous wave reference oscillator signal in line 58 as applied to the center tap 59 of the secondary winding 57 will produce equal and opposite voltages at each end of the center-tapped output load resistance 61 which effectively cancel each other at the center tap and produce zero voltage output in the line 65 from the balanced modulator 54. In the presence of a reflected pulse signal in line 53 and applied to the primary winding 64 of the input coil for the balanced modulator 54, a voltage pulse indicative in amplitude and polarity of the instantaneous phase amplitude relations between the reflected pulse signal in line 53 and the continuous wave reference oscillator signal in line 58 will be obtained in line 65.

The voltage pulses in line 65 are then employed to amplitude modulate at 66 the output signal of a frequency of ten megacycles per second from the local oscillator 67. The amplitude modulated output signal thus obtained in line 68 is then applied to a delay line 69 which may be of the mercury type or any other suitable type having a 500 microsecond delay equal to the radar transmitter pulse interval and functioning to thus delay any periodically varying electrical energy having a frequency of 10 megacycles per second applied thereto. The amplitude modulated ten-megacycle signal in line 68, indicative of the phase relations between the reflected pulse signal in line 53 and the signal output of the continuous wave reference oscillator locked in phase with the transmitted pulse, is also applied through line 70 to one input terminal of a comparison detector circuit 71. The other input terminal of the comparison detector circuit 71 is connected through line 72 to the output terminal of the delay line 69. The comparison detector circuit 71 consists of the pair of diode tubes 73 and 74 connected as shown. Diode tube 73 is connected as a positive rectifying detector while diode 74 is connected as negative rectifying detector and both detecting diodes 73 and 74 may be tuned to the ten-megacycle per second carrier frequency of the signal to be detected by the input coils 75 and 76. The positive and negative rectifier output signals from diodes 73 and 74 are connected together through a center-tapped output load resistance 77 such that equal amplitudes of detected signals by the tubes 73 and 74 will cancel each other at the center tap to produce zero voltage signal output in line 78. If the amplitudes of the detected signals applied to the input terminals of the respective detector diodes 73 and 74 are not equal, however, an output voltage or video pulse in line 78 will be obtained for application in any suitable manner to the moving target plan position indicating cathode ray tube 80 to thus produce an indication on the fluorescent screen of the tube whenever such output voltage pulse of any polarity is obtained. The cathode ray tube 80 is similar to the cathode ray tube 18 previously described except that the video signal applied thereto from line 78 is representative of moving objects or targets only within the range of the radar system as will be better understood from the following description of the operation of the moving target radar receiving system.

In order to assure that the transmitted radar pulses will have a pulse interval exactly equal to the delay interval in the delay line 69, which for the purposes of this description has been chosen to be 500 microseconds, a blocking oscillator 81 is provided normally having a repetition rate of between two and three kilocycles per second. The output trigger pulse from the blocking oscillator 81 is applied by line 82 to trigger the radar transmitter 10, and is also applied by line 83 to the input terminal 84 of the delay line 69. The blocking oscillator output pulse in line 83 applied to the delay line 69 appears at the output of the delay line after a time delay of 500 microseconds and is applied as a delayed synchronization pulse in lines 84 and 85 for again triggering the blocking oscillator 81 at a two-kilocycle repetition rate to produce subsequent trigger pulses in line 82. Thus the trigger pulses in line 82 provide a pulse interval for the radar transmitter 10 exactly equal to the delay line interval of 500 microseconds.

Considering now the operation of the moving target or object radar receiving and indicating system 50, it will be seen that voltage pulses indicative in amplitude and polarity of the phase relations of the reflected pulses in line 53 to the continuous wave reference oscillator signal in line 58 will appear in line 65. It should also be borne in mind that the continuous wave reference oscillator 51, as previously described, is continuously locked in phase with the phase of each transmitted pulse from the transmitter 10 so that, in effect, the pulse amplitude in line 64 is indicative of the instantaneous phase relation between each reflected pulse and each succeeding transmitted pulse. Assuming the reflected pulse to be indicative of a fixed object only and that the position of radar receiving and indicating system is also fixed, it will be seen that the pulse amplitude and polarity in line 65 will always be the same. However, should the reflected pulse be indicative of a moving object under such conditions the phase relation of the reflected pulse in line 53 to the continuous wave reference oscillator signal in line 58 will be changed considerably with each successive pulse and, therefore, there will be considerable variations in pulse amplitude or polarity for each successive voltage pulse in line 64. Again assuming the reflected signal to be indicative of a fixed object only, it will be understood that the amplitude modulated signal of a carrier frequency of ten megacycles per second in line 68 will have the same amplitude modulation envelope for each succeeding pulse representative of a reflected pulse from the fixed object. Therefore, the amplitude modulation envelope in line 70 indicative of the phase relation of a first reflected pulse will be equal at any given instant to the amplitude of the modulation envelope indicative of the phase relation of a preceding reflected pulse as delayed by the delay line 69, and when the equal amplitudes of the two signals in the respective lines 70 and 72 are positively and negatively rectified and compared by the comparison detector circuit 71, the resultant voltage or video output signal in line 78 will be zero. Thus, in such manner, the presence of a fixed object results in a zero video voltage in line 78 and causes the plan position indicating cathode ray tube 80 to give no visual indication of such fixed object. If, on the other hand, the reflected signal pulses in line 53 are indicative of a moving object, the amplitude of each succeeding pulse signal in line 65 will be considerably different and may even have a different polarity due to the change in phase relations between each succeeding reflected pulse in line 53 relative to the continuous wave reference oscillator signal in line 58, as previously described. Thus, the amplitude modulation envelope for the local oscillator signal from the ten-megacycle local oscillator 67 as appearing in line 68, representative of each succeeding reflected pulse, will be different when indicating a moving object and an output voltage or video signal will appear in line 78 from the output of the comparison of detector circuit 71 for indicating such moving object on the plan position indicating cathode ray tube 80. In other words, the amplitude of the modulation envelope in line 70 indicative of one phase condition of a reflected pulse from a moving object will be different from the amplitude of the modulation envelope in line 72 indicative of a different phase condition of a preceding reflected pulse from a moving object, and with the respective positive and negative rectifying detectors 73 and 74 connected as shown, a voltage output video signal will appear in line 78 indicative of the amplitude difference between said two amplitude-modulated signals in lines 70 and 72, respectively.

In view of the foregoing description, it will now be understood that the indication on the screen of the plan position indicating cathode ray tube 80 is representative of a moving target or object only within the radar system range while the indication on the standard radar receiving circuit and plan position indicating cathode ray tube 18 is indicative of both fixed and moving objects. In order to enable the presence of a moving object to be seen when it moves within the field of the fixed objects, the visual indications from the screens of both indicating tubes may be optically combined through the medium of the half-silvered mirror 90. As shown in the drawing, the indicator tube 18 may be positioned at right angles to the indicator tube 80 and the half-silvered mirror 90 may be positioned at a 45° angle between the viewing ends of the two tubes. Suitably different color filters 90 and 92, which may be red and green filters, respectively, are interposed between the half-silvered mirror 90 and the respective indicator tubes 18 and 80 to produce different optical senses for the indications from each of the tubes. Thus when viewing the optically combined visual indication in the direction of the arrow on the drawing, all fixed objects will be indicated in red color while moving objects will be indicated in a combined red and green or, optically speaking, a "yellowish" color appearing on the red background of the fixed objects. It should be understood that other choices of color filters or optical identifying senses for the respective indicating tubes 18 and 80 may be employed without departing from the spirit of the invention. For instance, assuming that both indicator tubes 18 and 80 have a white light emitting fluorescent screen, it is entirely practical to provide only the red color filter 90 in front of the indicator tube 18 in order to present the visual indications of both tubes 18 and 80 in different optical color senses. Similarly, the indicator tube 80 may be provided with a blue light emitting fluorescent screen while the indicating tube 18 may be provided with a white light emitting fluorescent screen in which case neither color filter is needed.

While the invention has been described in connection with one form of moving target or object receiving and indicating radar system of the type employing a continuous wave reference oscillator, it should be understood that other forms of moving target receiving and indicating systems such as the type employing reflections from fixed objects as a reference signal may also be used when providing for a simultaneous single presentation of both fixed and moving objects in the manner of this invention.

What is claimed is:

1. A radar receiving system comprising: a first circuit for detecting a first group of signals corresponding to all of the objects within the range of the system; means, receptive of said first group of signals, for producing visual indicia thereof; a second circuit for detecting a second group of signals corresponding only to the moving objects within the range of the system; means, receptive of said second group of signals, for producing visual indicia thereof; and means for viewing the visual indicia corresponding to said first and second groups of signals simultaneously in superposed relationship.

2. A radar receiving system comprising: a first circuit for detecting a first group of signals corresponding to all of the objects within the range of the system; means, receptive of said first group of signals, for producing visual indicia thereof; a second circuit for detecting a second group of signals corresponding only to the moving objects within the range of the system; means, receptive of said second group of signals, for producing visual indicia thereof; means for viewing the visual indicia corresponding to said first and second groups of signals simultaneously in superposed relationship; and filtering means of contrasting colors interposed, respectively, between said first and third-named means, and said second and third-named means.

3. A radar receiving system comprising: a first circuit for detecting a first group of signals corresponding to all of the objects within the range of the system; a first cathode ray tube, receptive of said first group of signals, for producing visual indicia thereof; a second circuit for detecting a second group of signals corresponding only to the moving objects within the range of the system; a second cathode ray tube, receptive of said second group of signals, for producing visual indicia thereof; said cathode ray tubes being disposed with their viewing ends at right angles to each other; and a half-silvered mirror disposed at a 45° angle with respect to the viewing ends of said cathode ray tubes for viewing the visual indicia corresponding to said first and second groups of signals simultaneously in superposed relationship.

4. A radar receiving system comprising: a first circuit for detecting a first group of signals corresponding to all of the objects within the range of the system; a first cathode ray tube, receptive of said first group of signals, for producing visual indicia thereof; a second circuit for detecting a second group of signals corresponding only to the moving objects within the range of the system; a second cathode ray tube, receptive of said second group of signals, for producing visual indicia thereof; said cathode ray tubes being disposed with their viewing ends at right angles to each other; a half-silvered mirror disposed at a 45° angle with respect to the viewing ends of said cathode ray tubes for viewing the visual indicia corresponding to said first and second groups of signals simultaneously in superposed relationship; and filtering means of contrasting colors interposed, respectively, between said first cathode ray tube and said mirror, and said second cathode ray tube and said mirror.

WILLIAM M. HALL.
HAROLD N. BEVERIDGE.

REFERENCES CITED

The following references are of record in the file of this patent:

UNITED STATES PATENTS

| Number | Name | Date |
|---|---|---|
| 2,251,984 | Cleaver | Aug. 12, 1941 |
| 2,408,050 | De Rosa | Sept. 24, 1946 |
| 2,408,848 | Hammond | Oct. 8, 1946 |
| 2,426,979 | Ayres | Sept. 9, 1947 |
| 2,434,897 | Ayres | Jan. 27, 1948 |
| 2,512,144 | Emslie | June 20, 1950 |
| 2,514,828 | Ayres | July 11, 1950 |